United States Patent [19]
Morikawa

[11] Patent Number: 5,031,594
[45] Date of Patent: Jul. 16, 1991

[54] IDLE SPEED CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 563,450

[22] Filed: Aug. 3, 1990

[30] Foreign Application Priority Data

Aug. 29, 1989 [JP] Japan .................. 1-222705

[51] Int. Cl.$^5$ .............................................. F02M 3/00
[52] U.S. Cl. ..................................... 123/339; 123/533
[58] Field of Search .............. 123/339, 531, 533, 73 C

[56] References Cited

U.S. PATENT DOCUMENTS

| | | | |
|---|---|---|---|
| 4,700,675 | 10/1987 | Okobe et al. | 123/339 |
| 4,780,827 | 10/1988 | Fujimori et al. | 123/339 |
| 4,794,901 | 1/1989 | Hong et al. | 123/533 |
| 4,932,371 | 6/1990 | Albertson et al. | 123/339 |
| 4,955,342 | 9/1990 | Tshimiya | 123/339 |
| 4,969,435 | 11/1990 | Morikawa et al. | 123/339 |

FOREIGN PATENT DOCUMENTS

| | | | |
|---|---|---|---|
| 56-113020 | 9/1981 | Japan | 123/339 |
| 57-86522 | 5/1982 | Japan | 123/339 |

Primary Examiner—Raymond A. Nelli
Attorney, Agent, or Firm—Martin A. Farber

[57] ABSTRACT

A two-cycle engine has a scavenge pump provided in an intake passage, and a fuel injector provided for injecting fuel directly in a cylinder of the engine. A control unit has a calculator for producing a fuel injection pulse width signal. Engine speed at idling state is compared with a desired idle speed and an error signal is produced. The pulse width signal is corrected with a correction value based on the error signal so as to converge the idle speed to the desired idle speed.

2 Claims, 6 Drawing Sheets

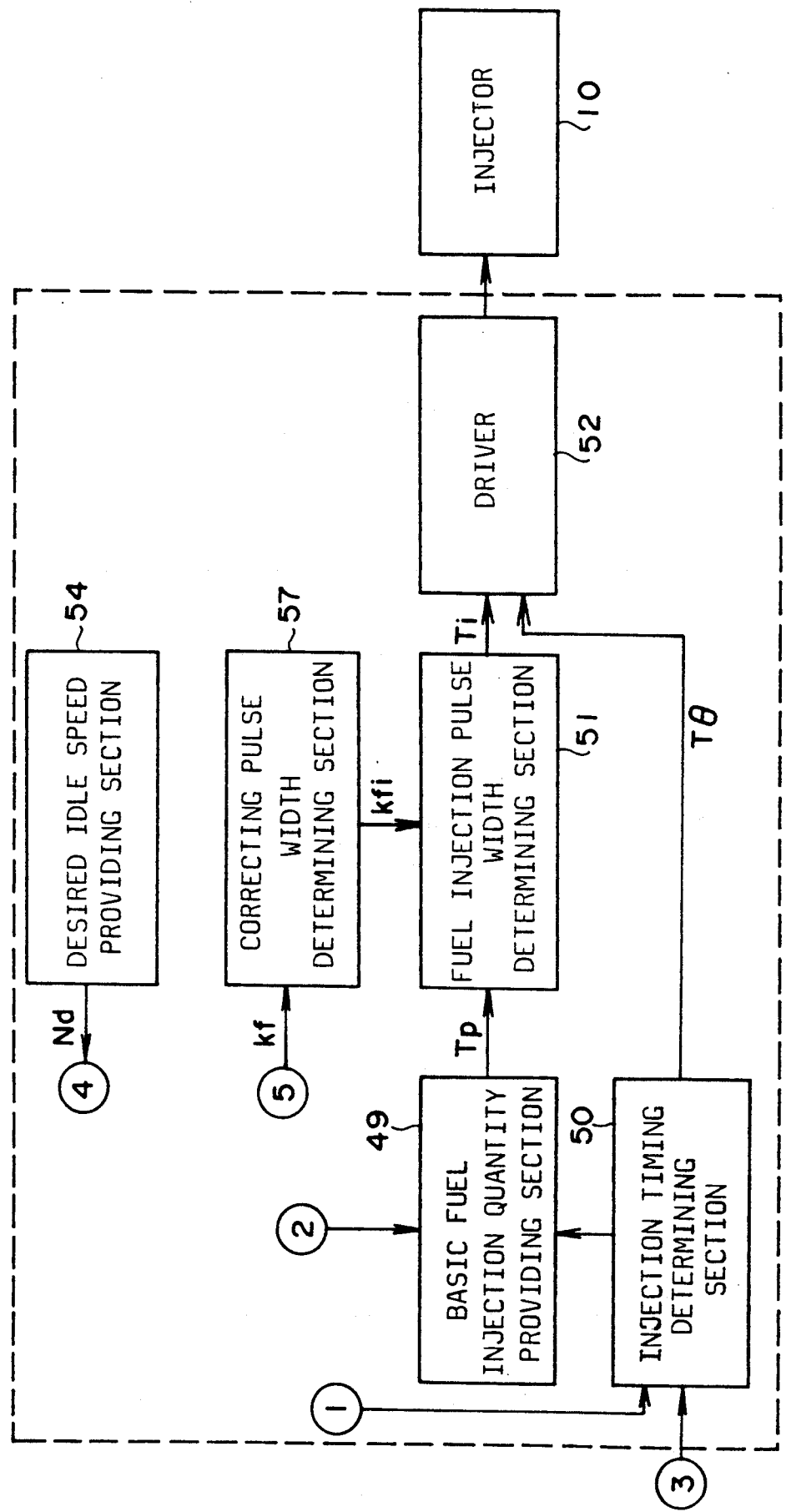

IDLE SPEED CONTROL SYSTEM FOR A TWO-CYCLE ENGINE

BACKGROUND OF THE INVENTION

The present invention relates to a two-cycle automotive engine with a direct fuel injection system, and more particularly to a system for controlling engine speed to a predetermined speed at an idling state of the engine.

In the two-cycle engine, one cycle of the operation in one cylinder is completed within one revolution of a crankshaft. Accordingly, sufficient amount of air is not induced into the cylinder.

In a crank-case-scavenged two-cycle engine, vacuum is produced in an enclosed crankcase of the engine to induce fresh air when a piston ascends. When the piston descends, burned gas is discharged through an exhaust port while the fresh air in the crankcase is admitted into a cylinder, thereby scavenging the cylinder. On the other hand, a throttle valve is provided in an intake system for controlling engine power. Quantity of intake air is adjusted in accordance with an opening degree of the throttle valve.

However, at light engine load, since the intake air quantity is small, the scavenging becomes insufficient, resulting in misfire and hence in an irregular engine operation. In addition, torque characteristics corresponding to engine operating conditions becomes uneven. Moreover, at heavy engine load, volume of the crankcase is insufficient for scavenging. Since combustion in an idling state is unstable, it is difficult to keep engine speed constant in the idling state and to sufficiently increase output torque at the heavy engine load.

Japanese Patent Application Laid-Open 57-86522 discloses a system in which a return passage is provided between a cylinder and a crankcase, separated from a scavenge passage. During a compression stroke, an amount of air-fuel mixture in the cylinder is returned to the crankcase through the return passage, thereby reducing an effective compression stroke of a piston.

Japanese Patent Application Laid-Open 56-113020 discloses an electronic governor for a diesel engine in which a difference between a desired engine speed and an actual engine speed is controlled by controlling quantity of fuel supplied to cylinders so as to maintain the difference within a predetermined small range.

In the former conventional system, the mixture extracted from the cylinder affects a compression ratio and an explosion pressure so that a desired engine power is not obtained. Further, since the pressure in the crankcase is increased, fresh air can not be sufficiently induced in the crankcase, which results in reducing intake air into the cylinder.

In the latter conventional system, the quantity of the fuel is controlled by changing a duty ratio of pulses applied to a solenoid operated control valve. A range of the quantity of the fuel controlled by the control valve is small. Accordingly, the system can be employed for an engine in which variation of the engine speed is comparatively small. Thus, if the system is employed in the two-cycle engine, idling speed of which is unstable because of unstable combustion, it is necessary to cause the stratified combustion in order to reduce fluctuation of the idling speed.

However, in the engine operated by the stratified combustion, even if the quantity of air is controlled, the engine speed at idling state does not change. Therefore, an idle speed control valve for controlling the engine speed can not be provided in a bypass formed in the intake pipe around a throttle valve.

SUMMARY OF THE INVENTION

The object of the present invention is to provide an idle speed control system for a two-cycle engine with a direct fuel injection system in which engine speed in an idling state is properly controlled.

According to the present invention, the two-cycle engine has a scavenge pump provided in an intake passage, and a fuel injector provided for injecting fuel directly in a cylinder of the engine. A calculator is provided for producing a fuel injection pulse width signal. The pulse width signal is corrected by a correction value so as to converge idle speed to a desired idle speed.

The system of the present invention has an engine speed sensor for detecting engine speed and for producing an engine speed signal, an accelerator sensor for detecting a depression degree of an accelerator pedal and for producing an accelerator depression degree signal, detector means for detecting an idling state of the engine and for producing an idle signal.

A control unit comprises first means responsive to the engine speed signal and the accelerator depression degree signal for calculating quantity of fuel injected from the fuel injector and for producing the fuel injection pulse width signal based on the calculated quantity, second means for providing an injection timing at the idling state, comparator means responsive to the idle signal and the engine speed signal for comparing the engine speed signal with a desired idle speed and for producing an error signal, correcting means responsive to the error signal for correcting the fuel injection pulse width signals with a correction value for controlling the injection quantity so as to converge the idle speed on the desired idle speed, injecting means for injecting fuel by a pulse width corrected with the correction value at the injection timing.

The injection timing is determined at a proper time for performing a stratified charge.

These and other objects and features of this invention will become understood from the following description with reference to the accompanying drawings.

BRIEF DESCRIPTION OF DRAWINGS

FIGS. 2a and 2b are blocks diagram showing a control unit according to the present invention;

DETAILED DESCRIPTION OF THE PREFERRED EMBODIMENT

Figure 1:
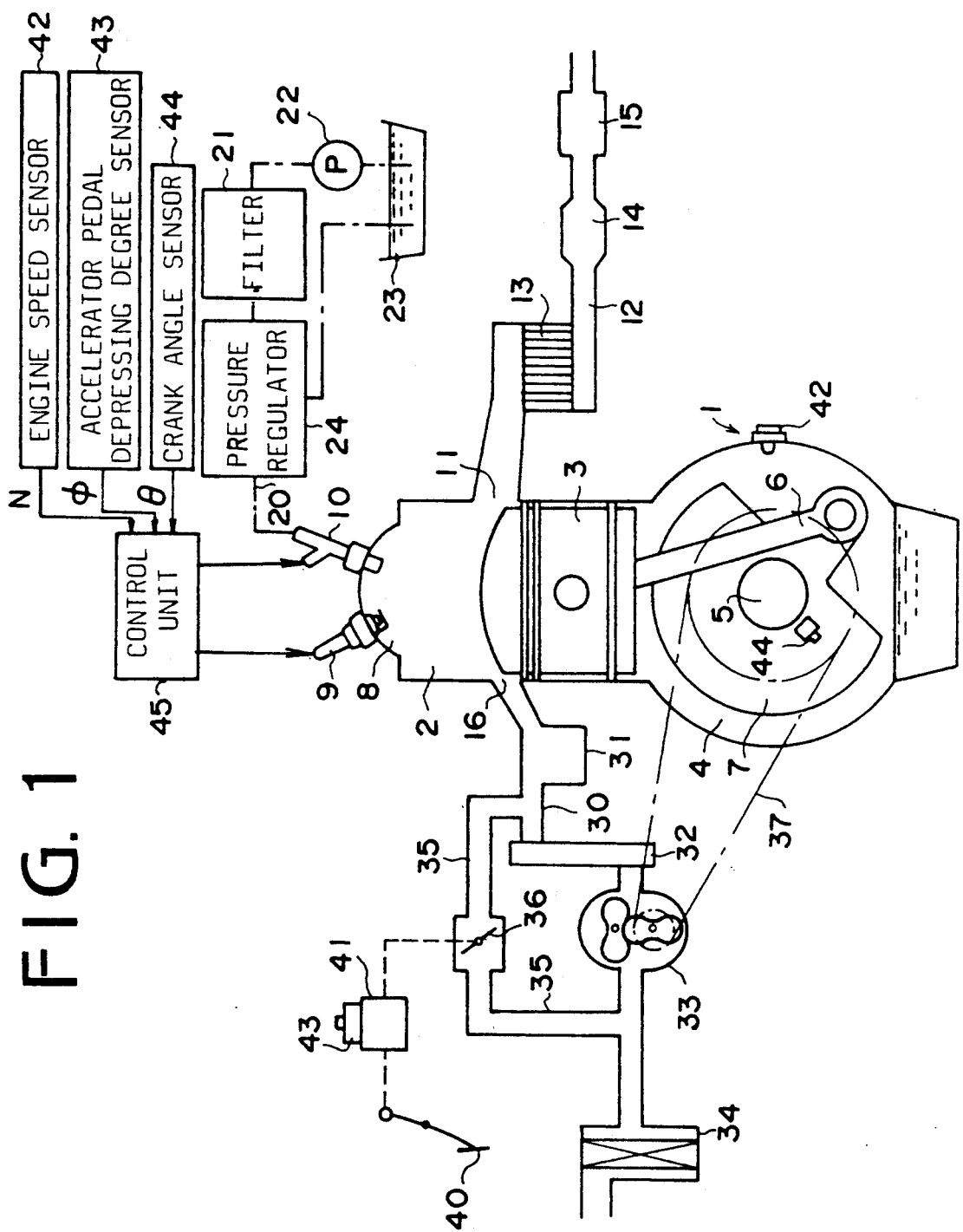
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce inertia of the piston 3 reciprocating in the cylinder 2.

In a wall of the cylinder 2, an exhaust port 11 and a scavenge port 16 are formed in 90 degrees angular disposition or opposing one another. The ports 11 and 16 are adapted to open at a predetermined timing with respect to a position of the piston 3.

A fuel injector 10 and a spark plug 9 are provided on a top of a combustion chamber 8 of the cylinder 2. Fuel in a fuel tank 23 is supplied to the injector 10 through a fuel passage 20 having a filter 21, a pump 22 and a pressure regulator 24 for constantly maintaining the fuel at a predetermined low fuel pressure.

The engine 1 is supplied with air through an air cleaner 34, a displacement scavenge pump 33, an intercooler 32 for cooling scavenge air, an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas is discharged from the engine 1 through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42, an accelerator pedal depressing degree sensor 43 and a crank angle sensor 44 are provided for determining engine operating conditions.

Output signals from the sensors 42, 43 and 44 are supplied to a control unit 45 which feeds an ignition signal, and a fuel injection pulse signal to the spark plug 9 and the injector 10, respectively.

Figure 2A:
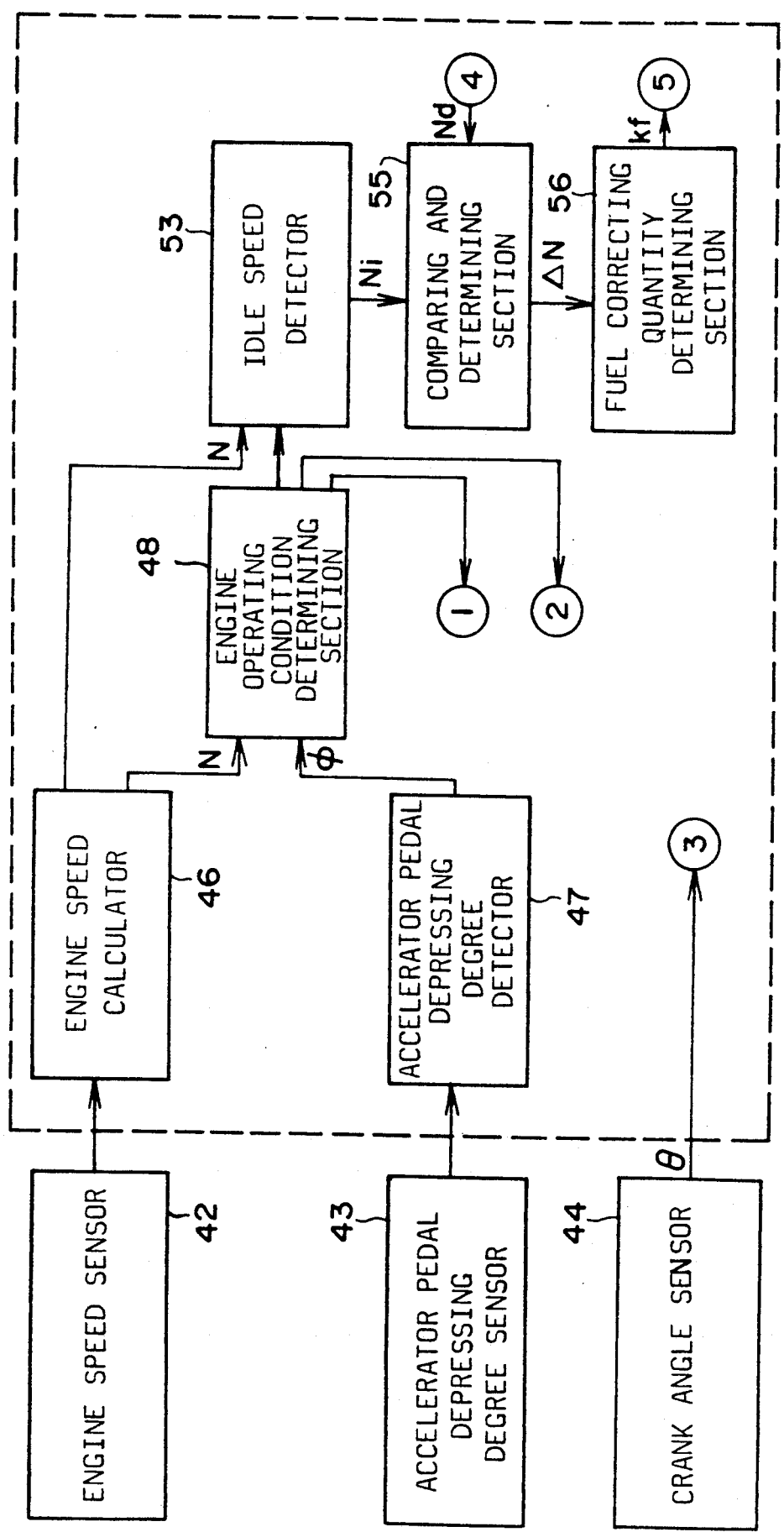

Referring to FIG. 2, the control unit 45 is provided with an engine speed calculator 46 to which an output signal from the engine speed sensor 42 is applied for calculating an engine speed N. An output signal from the accelerator pedal depressing degree sensor 43 is applied to an accelerator pedal depressing degree detector 47 for detecting an accelerator pedal depressing degree $\phi$. The engine speed N from the engine speed sensor 42 and the accelerator pedal depressing degree $\phi$ from the accelerator pedal depressing degree sensor 43 are applied to an engine operating condition determining section 48. An output signal of the engine operating condition determining section 48 is applied to a basic fuel injection quantity providing section 49 which calculates a basic quantity Tp of injected fuel in dependency on engine operating conditions. The basic fuel quantity Tp is applied to a fuel injection pulse width determining section 51 in which the basic fuel quantity Tp is converted into a fuel injection pulse width signal Ti. The pulse width signal Ti is applied to the fuel injector 10 through a driver 52 for driving the injector 10.

The output signal from the section 48 is further applied to a fuel injection timing providing section 50 to which a crank angle $\theta$ detected by the crank angle sensor 43 is applied. In the section 50, a fuel injection timing T$\theta$ is determined in accordance with the input signals. The fuel injection timing T$\theta$ is applied to the section 49 and to the driver 52 for injecting the fuel from the injector 10 at a predetermined timing.

The control unit 45 further has an idle speed detector 53 to which the engine speed N and the engine operating signal from the section 48 are applied for detecting an idle speed Ni. The idle speed Ni is applied to a comparing and determining section 55 which is applied with a desired idle speed Nd provided at a desired idle speed providing section 54. The comparing and determining section 55 compares the actual idle speed Ni and the desired idle speed Nd and determines the difference $\Delta$Ni between the actual idle speed Ni and the desired idle speed Nd. The difference $\Delta$Ni from the comparing and determining section 55 is applied to a fuel injection correcting quantity determining section 56 in which a correcting quantity Kf of the fuel corresponding to the difference $\Delta$Ni is determined. The correcting quantity Kf is applied to a correcting pulse width determining section 57 which determines a correcting pulse width Kfi of the fuel injection. The correcting pulse width Kfi is applied to the fuel injection pulse width determining section 51 for correcting the fuel injection pulse width Ti based on the difference $\Delta$Ni.

An operation of the two-cycle engine is described hereinafter.

The air supplied from the scavenge pump 33 and cooled at the intercooler 32 is returned to the inlet side of the scavenge pump 33 through the bypass 35. Since an opening degree $\alpha$ of the control valve 36 is controlled to be inversely proportional to a depressing degree $\phi$ of the accelerator pedal 40, when the depressing degree $\phi$ of the accelerator pedal 40 is small, the control valve 36 is largely opened. As a result, a large amount of air is returned to the inlet side of the scavenge pump 33. Thus, a small amount of the air, which corresponds to the small accelerator pedal depressing degree, flows into the cylinder 2 for scavenging without causing pumping loss. As the depressing degree $\phi$ increases, the quantity of fresh air forced into the cylinder 2 increases with closing the control valve 36.

When the piston 3 reaches a position close to the bottom dead center as shown in FIG. 1, the scavenge port 16 opens as well as the exhaust port 11 so that intake air, quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that the fresh intake air is admitted therein in a short time. During the compression stroke, the piston 3 ascends and closes both ports 11 and 16.

A small amount of the fuel accumulated in the fuel injector 10 in accordance with the fuel injection pulse width signal from the control unit 45 is injected from the injector 10 and mixed with the fresh air. The mixture is swirling in the combustion chamber 8 with the scavenging air and ignited by the spark plug 9 immediately before the top dead center.

Figure 4:
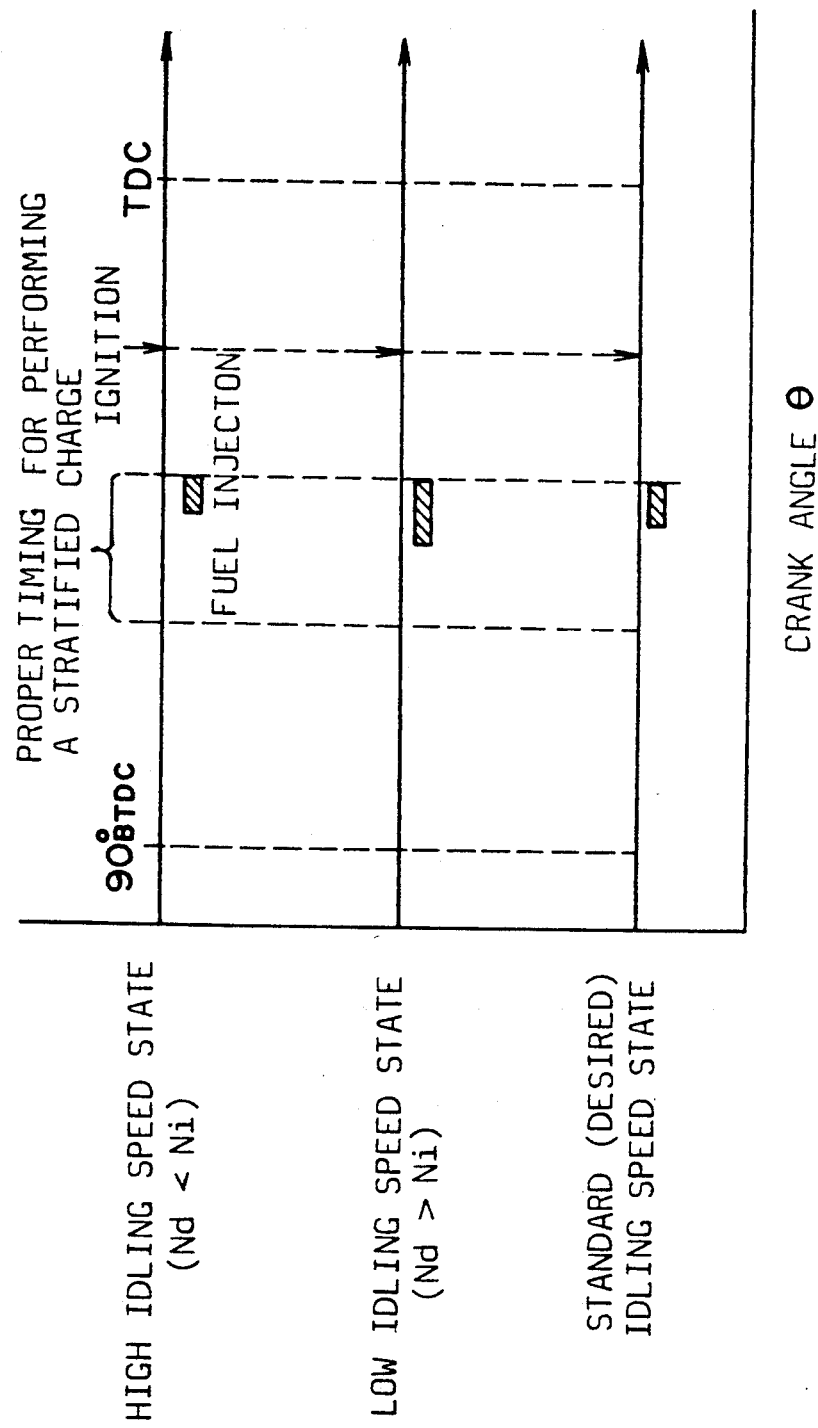
FIG. 4 is a graph showing a time chart for fuel injection timing.

Here, the fuel is injected at a predetermined desired timing and with a pulse width as shown in FIG. 4 for performing charge stratification. The injected fuel reaches the spark plug 9 which is properly disposed in the combustion chamber 8 so that the mixture around the spark plug 9 becomes rich to achieve charge stratification.

After explosion, the piston 3 descends for power stroke. Accordingly, the exhaust port 11 is opened so that the burned gas in the cylinder 2 which is still under high pressure escapes. The piston 3 further descends, thereby returning to the afore-described intake stroke where the cylinder 2 is scavenged.

The engine operating condition is detected in the engine operating condition determining section 48 in accordance with the engine speed N and the accelerator pedal depressing degree $\phi$. Quantity of injected fuel is calculated in the basic fuel injection quantity determining section 49. Based on the basic fuel injection quantity Tp, the fuel injection pulse width signal Ti is applied to the fuel injector 10 through the driver 52. Thus, the fuel is controlled in accordance with the engine operating conditions.

Figure 3:
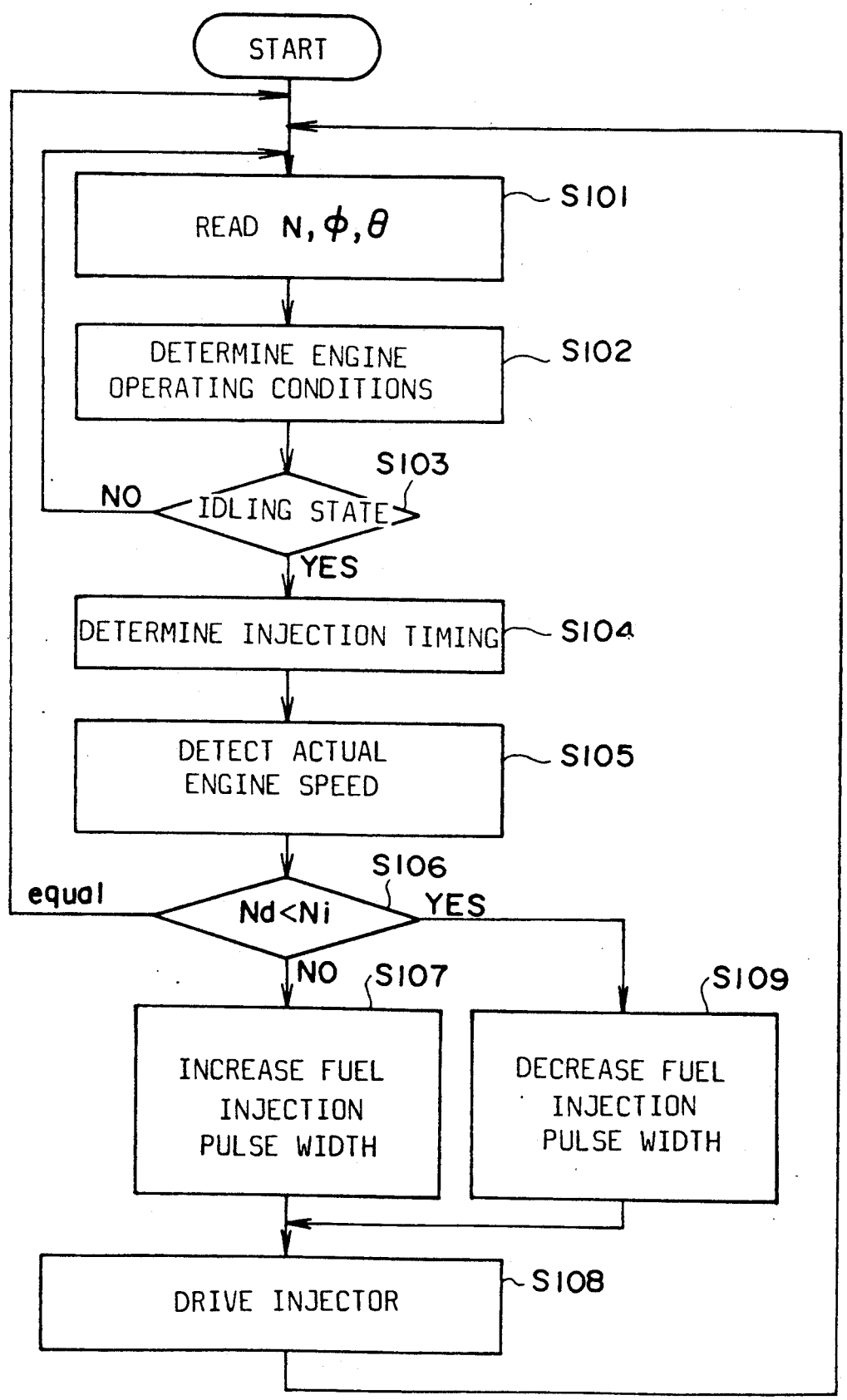
FIG. 3 is a flowchart showing an operation of the system.

The operation of the system at the idling state is described with reference to the flowchart of FIG. 3. The engine speed N, the accelerator pedal depressing degree $\phi$, and the crank angle $\theta$ detected by the sensors 42, 43 and 44 are read at a step S101. At a step S102, the engine operating conditions are determined, and the idling state is determined at a step S103. If the idling state is determined, a desired injection timing for obtaining stratified combustion is determined at a step S104. Namely an injection timing at which the pressure in the cylinder becomes a proper value for forming a stratified charge is determined. Therefore, the actual idle speed is detected at a step S105. At a step S106, it is determined whether the actual idle speed Ni is higher than the desired idle speed Nd or not. If the actual idle speed Ni is higher than the desired idle speed Nd(Nd<Ni) as shown in FIG. 4, the program goes to a step S109 where the fuel injection pulse width signal Ti is corrected to decrease the pulse width so that the quantity of the fuel from the fuel injector 10 is reduced. At a step S108, the corrected quantity of fuel is injected at a predetermined timing. Thus, the engine speed N is reduced to converge to the desired idle speed Nd. If Nd>Ni is determined at step S106, the fuel injection pulse width signal Ti is corrected at a step S107 to increase the pulse width. The corrected fuel is injected at a predetermined timing at step S108. Accordingly, the idle speed Ni is controlled to the desired idle speed Nd.

Figure 5:
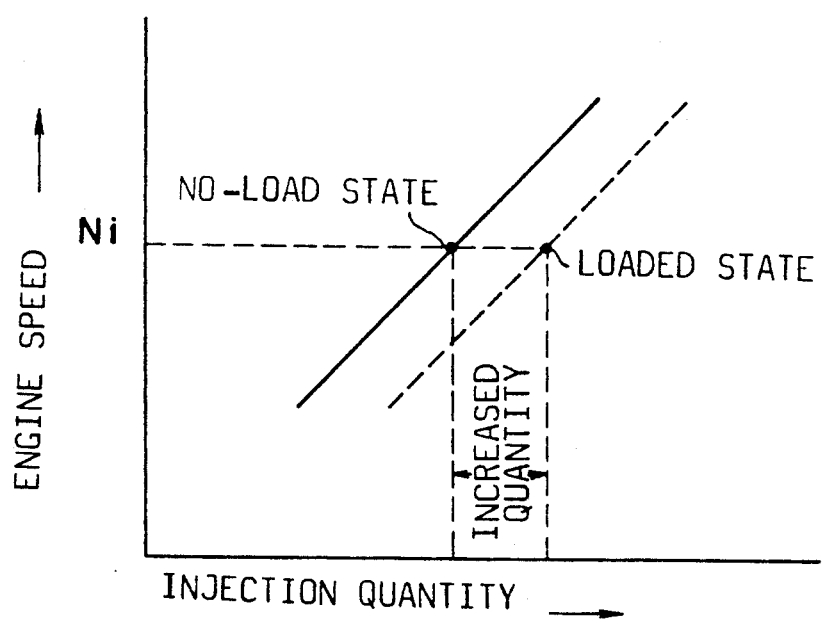
FIG. 5 is a graph showing characteristics between quantity of injected fuel and engine speed.

The engine speed in idling conditions changes with the fuel injection pulse width as shown by a solid line of FIG. 5 in the stratified combustion mode, where the quantity of the intake air is constant. If a load on the engine increases, for example by the operation of an air conditioner at the idling speed Ni, the quantity of fuel injection is increased to keep the engine speed N at idling state as shown by a dotted line of FIG. 5. Thus, the idle speed Ni is controlled to the desired idle speed Nd without affecting the charge stratification.

In accordance with the present invention, the fuel injection pulse width is corrected by a correcting pulse width based on the difference between the actual idle speed and the desired idle speed. Consequently, the idle speed maintains at the desired idle speed without being affected by the variation and the change of load, thereby ensuring the charge stratification.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling idle speed of a two-cycle automotive engine having at least one cylinder, a scavenge port, an intake passage communicated with said scavenge port, a fuel injector provided for injecting fuel directly in the cylinder, a scavenge pump provided in said intake passage for supplying air to the cylinder, an engine speed sensor for detecting engine speed and for producing an engine speed signal, an accelerator sensor for detecting depression degree of an accelerator pedal and for producing an accelerator depression degree signal and detector means for detecting an idling state of the engine and for producing an idle signal, an improvement of the system which comprises;

first means responsive to said engine speed signal and said accelerator depression degree signal for calculating quantity of said fuel injected from the fuel injector and for producing a fuel injection pulse width signal based on the calculated quantity, second means for providing an injection timing at the idling state;

comparator means responsive to said idle signal and said engine speed signal for comparing the engine speed signal with a desired idle speed and for producing an error signal;

correcting means responsive to the error signal for correcting said fuel injection pulse width signals with a correction value for controlling the injection quantity so as to converge the idle speed on the desired idle speed, and injecting means for injecting said fuel by a pulse width corrected with said correction value at said injection timing.

2. The system according to claim 1, wherein said injection timing is determined at a time proper for performing a stratified charge.

* * * * *